United States Patent [19]

Bouteille

[11] Patent Number: 5,674,148
[45] Date of Patent: Oct. 7, 1997

[54] FINAL DRIVE JOINT ASSEMBLY

[75] Inventor: Remi E. Bouteille, Echirolles, France

[73] Assignee: Caterpillar Inc., Peoria, Ill.

[21] Appl. No.: 594,067

[22] Filed: Jan. 30, 1996

[51] Int. Cl.⁶ .................................................. F16H 1/00
[52] U.S. Cl. ........................................ 475/343; 475/331
[58] Field of Search .................................. 475/331, 343; 305/100, 199

[56] References Cited

U.S. PATENT DOCUMENTS

| | | | |
|---|---|---|---|
| 3,111,859 | 11/1963 | Malone | 74/243 |
| 4,132,134 | 1/1979 | Avery et al. | 475/343 |
| 4,158,971 | 6/1979 | Szalai et al. | 475/343 |
| 4,346,624 | 8/1982 | Nagasaki et al. | 475/331 |
| 4,472,164 | 9/1984 | Pusch et al. | 474/161 |
| 4,649,772 | 3/1987 | Daniel et al. | 475/331 |
| 4,662,246 | 5/1987 | Cheek et al. | 475/343 |
| 5,161,867 | 11/1992 | Johnson | 305/57 |

*Primary Examiner*—Dirk Wright
*Attorney, Agent, or Firm*—Claude F. White; Diana L. Charlton

[57] ABSTRACT

A joint assembly for a final drive arrangement includes a first sprocket member, a second planet carrier member, and a third supporting hub member. The three members are connected and held together by a large number of common large size connecting bolts and nuts. The planet carrier and supporting hub are also connected and held together by a small number of separate smaller size threaded fasteners. This provides that the sprocket member can be removed for servicing or replacement and the planet carrier will remain in place and connected to the supporting hub.

9 Claims, 2 Drawing Sheets

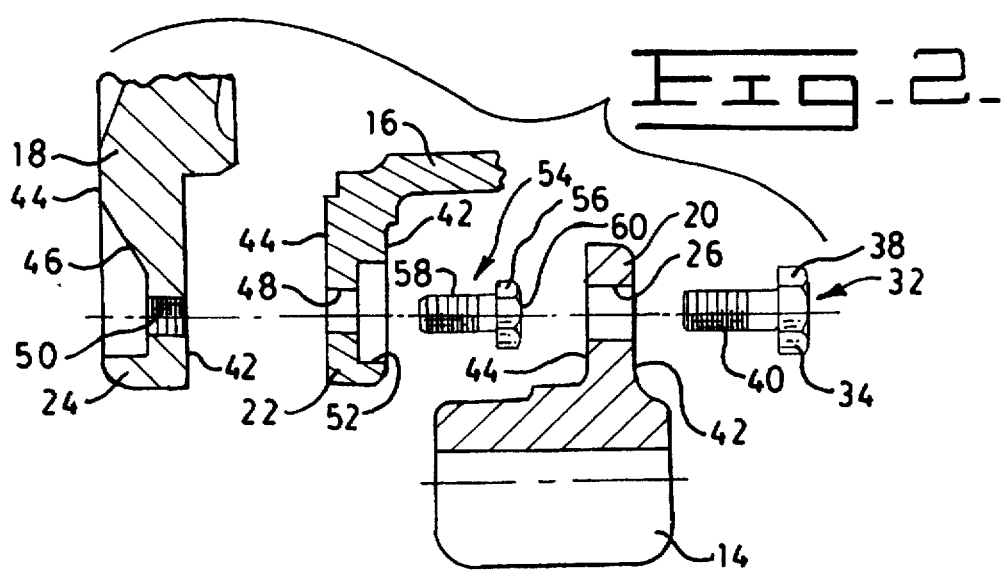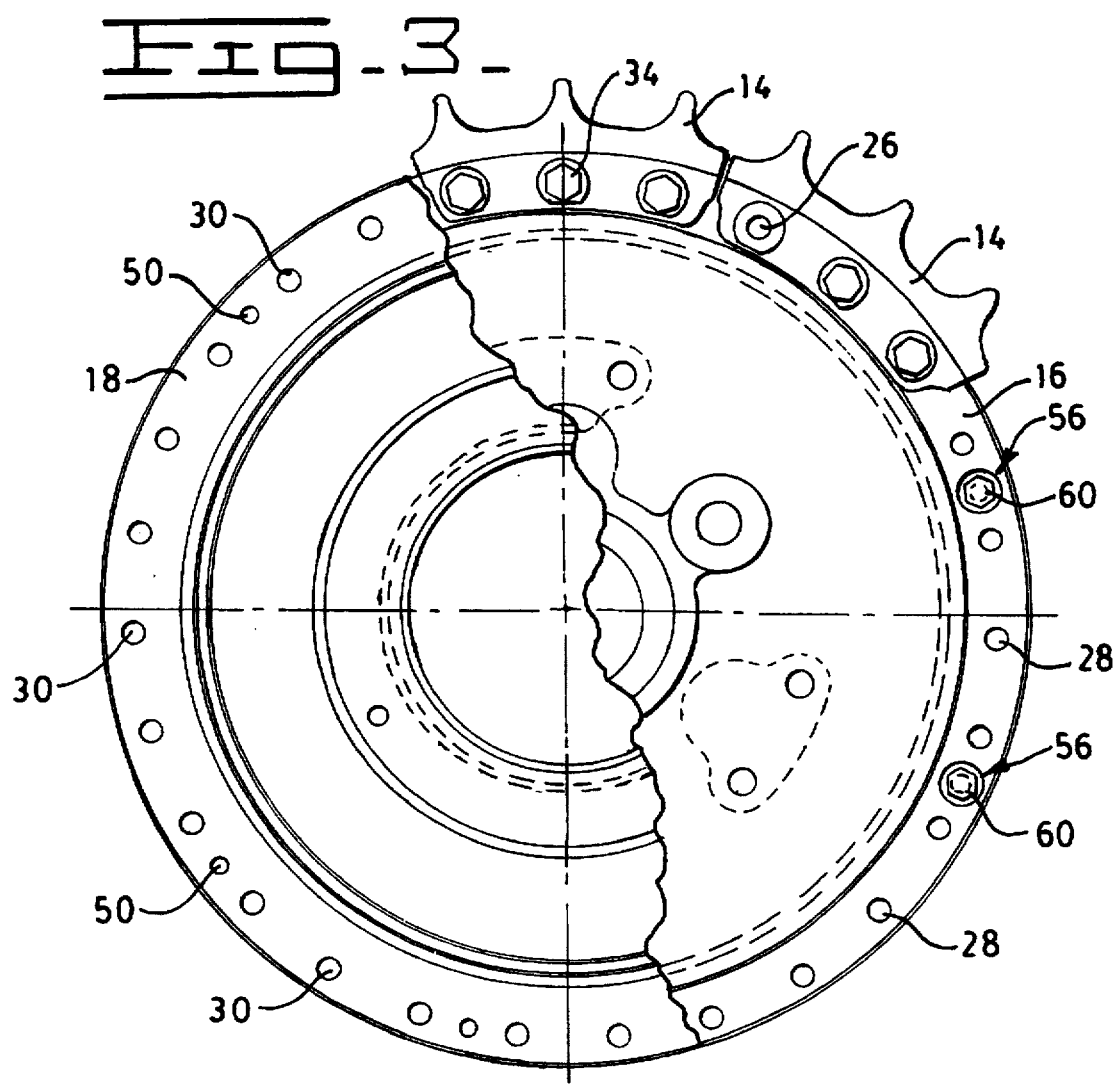

FINAL DRIVE JOINT ASSEMBLY

TECHNICAL FIELD

This invention relates generally to a joint assembly for a final drive arrangement and more particularly to an assembly having a plurality of structural members connected together by a plurality of common fastening means.

BACKGROUND ART

Earthmoving and construction machines, such as track-type tractors, track-type loaders, and excavators utilize a multiple tooth sprocket wheel to engage and drive the endless track which propels the work machine. The sprocket wheel is connected to a final drive gear arrangement for providing power from the machine engine to the sprocket wheel. The sprocket wheel is generally connected to a hub member by a large number of threaded fasteners and a gear carrier member is also generally connected to the hub member by another large number of threaded fasteners. This requires an extremely large number of large size threaded fasteners, but is generally acceptable since the sprocket wheel is removed and replaced, or serviced, more often than the gear carrier.

The present invention is directed to overcoming one or more of the problems as set forth above.

DISCLOSURE OF THE INVENTION

In one aspect of the present invention, a joint assembly includes first, second, and third structural members with each member having respective first, second and third radially extending flange portions. Each flange portion defines a plurality of opening therethrough, with each of the openings in the first flange portion aligning with one of the openings in the second and third flange portions. A plurality of fastening means penetrates each of the aligned openings and connects the first, second and third structural members together.

Prior art final drive assemblies for construction and earthmoving machines include a toothed drive sprocket wheel, a supporting hub, and a gear carrier member. The gear carrier and hub are generally connected together by a large number of large size threaded fasteners which engage threaded openings in the supporting hub. The sprocket wheel and supporting hub are also connected together by a large number of separate large size fasteners. Advantageously, a single set of fasteners could be used to connect the supporting hub, sprocket wheel, and gear carrier together. However, with such an arrangement, when the sprocket wheel is removed for servicing or replacement, the gear carrier, and associated gears, would also need to be removed from the supporting hub.

The subject arrangement provides a solution to the above noted problems by providing a small number of separate threaded fasteners to hold the gear carrier and hub together when the sprocket wheel is removed. The separate fasteners are preferably sandwiched between the sprocket wheel and the gear carrier. This unique arrangement eliminates a large number of large size fasteners and eliminates threading of the bolt receiving openings in the supporting hub.

BRIEF DESCRIPTION OF THE DRAWINGS

FIG. 2 is a diagrammatic enlarged exploded and sectional view of a connecting joint of the subject invention; and FIG. 3 is a diagrammatic sectional view taken generally along lines 3—3 of FIG. 1.

BEST MODE FOR CARRYING OUT THE INVENTION

Figure 1:
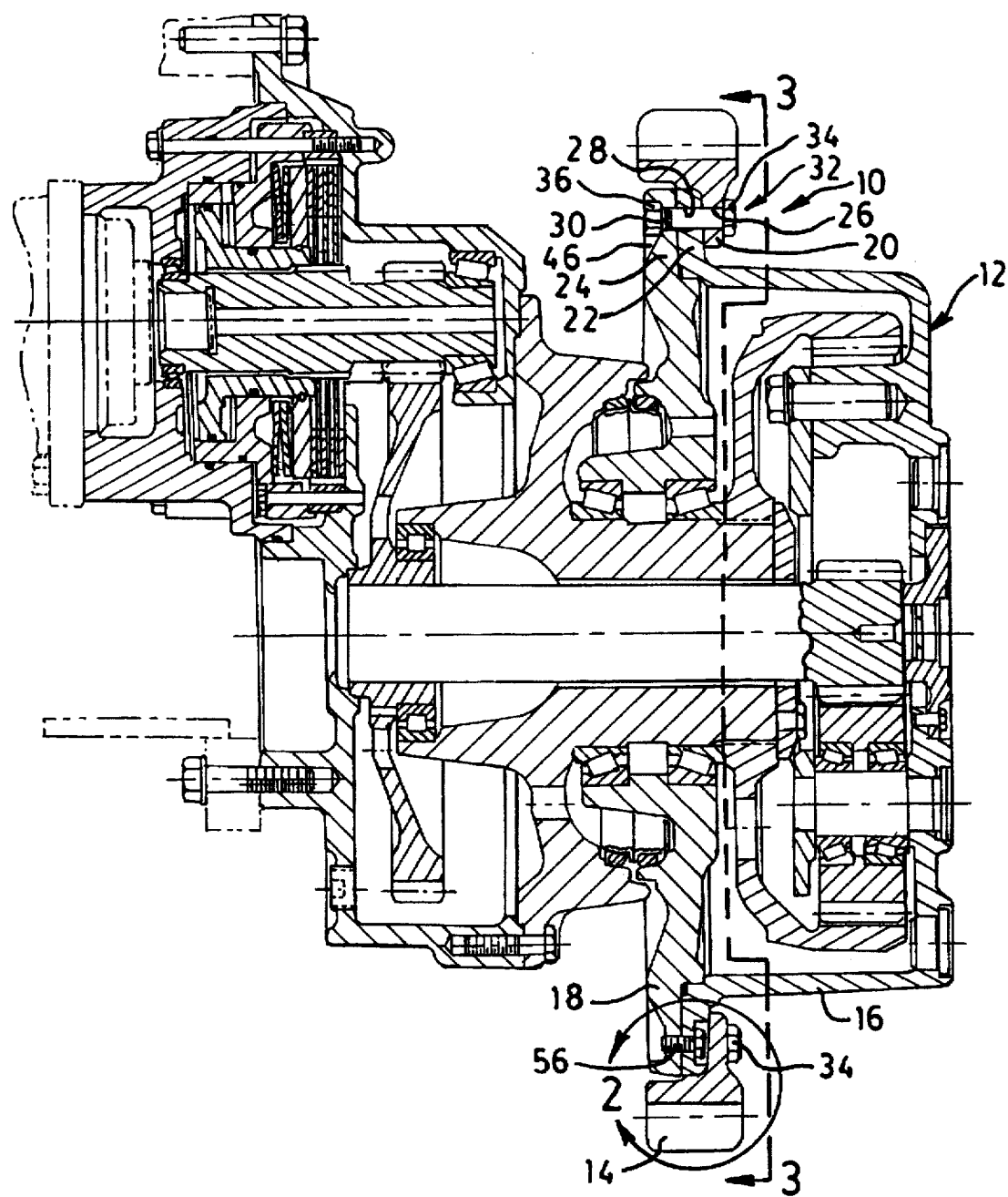
FIG. 1 is a diagrammatic section view of a final drive assembly incorporating the subject invention.

With reference to the drawings, a joint assembly 10 for a final drive arrangement 12 includes a first structural member 14, such as a drive sprocket 14, a second structural member 16, such as a planet gear carrier 16, and a third structural member 18, such as a supporting hub 18. The first, second, and third members 14,16,18 each have respective first, second, and third radially extending flange portions 20,22, 24. Each flange portion 20,22,24 defines respectively a plurality of first, second, and third bolt receiving openings 26,28,30 therethrough. Each of the first openings 26 is adapted to align with one of the second and third openings 28,30. The joint assembly 10 further includes a plurality of first fastening means 32, such as threaded connecting bolts 34 and threaded nuts 36. Each connecting bolt 34 has a head portion 38 and a threaded shaft portion 40, and one of the connecting bolts 34 is adapted to penetrate each of the aligned first, second, and third openings 26,28,30. The nuts 36 are adapted to engage the threaded shaft portions 40 of the connecting bolts 34 and connect the first, second, and third structural members 14,16,18 together.

Each of the first, second, and third flange portions 20,22, 24, has first and second contact surfaces 42,44 with the second contact surface 44 of the first flange portion 20 mating with the first contact surface 42 of the second flange portion 22, and the first contact surface 42 of the third flange portion 24 mating with the second contact surface 44 of the second flange portion 22. The second radially extending flange portion 22 is, therefore, sandwiched and positioned between the first and third flange portions 20,24. The head portion 38 of each connecting bolt 34 is adapted to contact the first contact surface 42 of the first flange portion 20, and each nut 36 is adapted to contact the second contact surface 44 of the third flange portion 24. The second contact surface 44 of the third flange portion 24 includes a plurality of first counterbores 46 with one counterbore 46 surrounding each of the third openings 30. Each of the nuts 36 is adapted to be positioned within one of the counterbores 46.

The second flange portion 22 of the planet carrier 16 defines a plurality of fourth openings 48 therethrough, and the third flange portion 24 of the supporting hub 18 defines a plurality of fifth openings 50 therethrough. The fourth and fifth openings 48,50 are arranged in a circular pattern and have a common radius. Each of the fourth openings 48 is aligned with one of the fifth openings 50, with each of the fifth openings 50 being threaded. The first contact surface 42 of the second flange portion 22 includes a plurality of second counterbores 52, with one of the counterbores 52 surrounding each of the fourth openings 48. A plurality of second fastening means 54 are adapted to penetrate the fourth and fifth aligned openings 48,50 and connect the second and third members 14,16 together. The fastening means 54 includes a plurality of threaded fasteners 56, each having a threaded shaft portion 58 and a head portion 60. The threaded shaft portion 58 is adapted to penetrate the fourth openings 48 and engage the threaded fifth openings. The head portion 60 of each threaded fastener 56 is adapted to be contained within one of the second counterbores 52. This provides that the second contact surface 44 of the sprocket flange portion 20 can mate with the first contact surface 42 of the planet carrier flange portion 22.

With particular reference to FIG. 3, the first, second, and third openings 26,28,30 are arranged in a circular pattern and each opening 26,28,30 is equally spaced from an adjacent opening 26,28,30. The first, second, and third openings also have a common radius.

INDUSTRIAL APPLICABILITY

With reference to the drawings and the previous detailed description, the subject invention is particularly useful with final drive arrangements 12 of earthmoving and construction machines, specifically such machines having a drive sprocket for driving an endless track assembly. The joint assembly 10 includes a first drive sprocket member 14, a second planet carrier member 16, and a third supporting hub member 18. The three members 14,16,18 are connected and held together by a plurality of connecting bolts 34 and nuts 36. The connecting bolts 34 penetrate a plurality of first, second, and third openings 26,28,30 in first, second, and third flange portions 20,22,24 of the first, second and third members 14,16,18.

Since the first member 14 is a drive sprocket 14 which drives an endless track (not shown), it is subject to wear and must be periodically serviced or replaced. This is accomplished by removing the plurality of connecting bolts 34 and nuts 36, removing the worn sprocket member 14, and replacing with a new sprocket member 14. However, to prevent the second planet carrier member 16 from being removed at the same time, a second plurality of smaller threaded fasteners 56 hold the planet carrier 16 to the supporting hub 18 when the larger number of large size connecting bolts 34 are removed. Generally, the smaller threaded fasteners number about six. The head portions 60 of the smaller threaded fasteners 56 are contained within second counterbores 52 to provide that the first flange portion 20 of the sprocket member 14 can fit flush against the second flange portion 22 of the planet carrier 16. If the planet carrier 16 and related components should need servicing or replacement, the six small threaded fasteners 56 can be removed to separate the planet carrier 16 from the supporting hub 18.

Other aspects, objects and advantages of this invention can be obtained from a study of the drawings, the disclosure and the appended claims.

I claim:

1. A joint assembly, comprising:

a first structural member having a first radially extending flange portion including first and second contact surfaces, said first flange portion defining a plurality of first openings therethrough;

a second structural member having a second radially extending flange portion including a first contact surface connecting with the second contact surface of the first flange portion and a second contact surface, said second flange portion defining a plurality of second openings therethrough;

a third structural member having a third radially extending flange portion including a first contact surface connecting with the second contact surface of the second flange portion and a second contact surface with a plurality of first counterbores, said third flange portion defining a plurality of third openings therethrough with each of the plurality of third openings being surrounded by one of the plurality of first counterbores, each of said first openings being adapted to align with one of said second and third openings; and a plurality of first fastening means, one of the first fastening means being adapted to penetrate each of said first, second, and third aligned openings, and connect said first, second, and third structural members together.

2. A joint assembly, as set forth in claim 1, wherein each of said first fastening means includes a threaded fastener having a head portion and a threaded shaft portion, and a threaded nut, said head portion being adapted to contact said first contact surface of said first flange portion, said threaded nut being adapted to contact said second contact surface of said third flange portion, and each of said threaded nuts being positioned within one of said counterbores.

3. A joint assembly, as set forth in claim 1, wherein said first, second, and third openings are arranged in a circular pattern on respective first, second and third flange portions and each opening is equally spaced from an adjacent opening.

4. A joint assembly, as set forth in claim 1, wherein said second flange portion defines a plurality of fourth openings therethrough and said third flange portion defines a plurality of fifth openings therethrough, said fourth and fifth openings being arranged in a circular pattern and having a common radius.

5. A joint assembly, as set forth in claim 4, wherein said second flange portion has a first contact surface and said first contact surface includes a plurality of second counterbores, one counterbore surrounding each of said fourth openings; and including a plurality of second fastening means, said second fastening means being adapted to penetrate said fourth and fifth openings and connect said second and third members together.

6. A joint assembly, as set forth in claim 5, wherein said fifth openings are threaded and each of said second fastening means includes a threaded fastener having a threaded shaft portion and a head portion, said threaded shaft portions being adapted to engage said threaded openings, and said head portions being adapted to be positioned within said second counterbores.

7. A joint assembly, as set forth in claim 1, wherein said assembly is a final drive mechanism and said first member is a drive sprocket, said second member is a planet carrier for supporting a plurality of planet gears, and said third member is a supporting hub.

8. A final drive assembly comprising:

a drive sprocket having a first radially extending flange portion, said first flange portion defining a plurality of first bolt receiving openings therethrough;

a planet carrier having a second radially extending flange portion including a plurality of counterbores, said second flange portion defining a plurality of second bolt receiving openings therethrough;

a supporting hub having a third radially extending flange portion, said third flange portion defining a plurality of third bolt receiving openings therethrough, each of said first openings being adapted to align with one of said second and third openings;

a plurality of connecting bolts and nuts, one of said bolts being adapted to penetrate each of said first, second, and third aligned openings and said nuts being adapted to engage said bolts to connect said sprocket, carrier, and hub together;

said second flange portion of said carrier defining a plurality of fourth openings therethrough with each of said plurality of fourth openings being surrounded by one of said plurality of counterbores and said third flange portion defining a plurality of fifth openings therethrough; and a plurality of threaded fasteners each having a threaded shaft portion and head portion, said fasteners being adapted to penetrate said fourth and fifth openings and connect said second and third members together with the head portion being adapted to be positioned within said counterbores.

9. A final drive assembly, as set forth in claim 8, wherein said fifth openings are threaded and said threaded shaft portion is adapted to engage said threaded openings.

* * * * *